United States Patent
Harke (10) Patent No.: US 9,623,718 B2
(45) Date of Patent: Apr. 18, 2017

(54) WATER CHAMBER FOR A MOTOR VEHICLE

(71) Applicant: WEIDMANN PLASTICS TECHNOLOGY AG, Rapperswil (CH)

(72) Inventor: Stefan Harke, Wollerau (CH)

(73) Assignee: WEIDPLAS GmbH, Küsnacht (CH)

( * ) Notice: Subject to any disclaimer, the term of this patent is extended or adjusted under 35 U.S.C. 154(b) by 93 days.

(21) Appl. No.: 14/396,273

(22) PCT Filed: Apr. 26, 2013

(86) PCT No.: PCT/EP2013/058709
§ 371 (c)(1),
(2) Date: Oct. 22, 2014

(87) PCT Pub. No.: WO2013/164260
PCT Pub. Date: Nov. 7, 2013

(65) Prior Publication Data
US 2015/0151606 A1 Jun. 4, 2015

(30) Foreign Application Priority Data

Apr. 30, 2012 (EP) .................................... 12166145

(51) Int. Cl.
*B60H 1/00* (2006.01)
*B60H 1/28* (2006.01)
(Continued)

(52) U.S. Cl.
CPC ......... *B60H 1/00021* (2013.01); *B01D 45/08* (2013.01); *B60H 1/00321* (2013.01);
(Continued)

(58) Field of Classification Search
CPC .......... B60H 1/00; B60H 1/28; B60H 1/3202; B60H 1/00021; B60H 1/3233; F25D 21/14
(Continued)

(56) References Cited

U.S. PATENT DOCUMENTS 4,412,425 A 11/1983 Fukami et al.
4,956,979 A * 9/1990 Burst ................... B60H 1/3233
454/147
(Continued)

FOREIGN PATENT DOCUMENTS

DE 196 13 684 A1 10/1997
DE 199 32 691 A1 1/2001
(Continued)

OTHER PUBLICATIONS

International Search Report of PCT/EP2013/058709 dated Jul. 3, 2013 [PCT/ISA/210].

*Primary Examiner* — Jacob T Minskey
*Assistant Examiner* — Minh-Chau Pham
(74) *Attorney, Agent, or Firm* — Sughrue Mion, PLLC (57) ABSTRACT

A water chamber (10) for a motor vehicle (1) having a wall (13, 20, 21) which defines a first interior (23). The water chamber (10) has at least one air inlet opening (9), through which air can flow into the first interior (23), and at least one air outlet opening (25), through which air can flow out of the first interior (23). A water outlet opening (17) is present that is suitable for removing water from the first interior (23). The water chamber (10) is designed as a heat exchanger, comprising a heat exchange element (13, 20, 21; 16'), which is used to transfer thermal energy from exhaust air into the first interior (23). The water chamber also has a structure (8, 26, 27, 40; 8') that is used to direct exhaust air to the heat exchange element (13, 20, 21; 16').

14 Claims, 3 Drawing Sheets

(51) Int. Cl.
  *F25D 21/14* (2006.01)
  *B01D 45/08* (2006.01)
  *F24F 3/16* (2006.01)

(52) U.S. Cl.
  CPC ............... *B60H 1/28* (2013.01); *F24F 3/16* (2013.01); *B60H 2001/00214* (2013.01)

(58) Field of Classification Search
  USPC ............... 55/385.3; 123/198 E; 62/291, 285; 454/121, 147
  See application file for complete search history.

(56) References Cited

U.S. PATENT DOCUMENTS

| | | | |
|---|---|---|---|
| 5,518,449 A | 5/1996 | Danieau | |
| 2005/0229619 A1* | 10/2005 | Monnier | B60H 1/3233 62/285 |
| 2011/0021130 A1* | 1/2011 | Kim | B60H 1/00028 454/121 |
| 2013/0088050 A1* | 4/2013 | Lacroix | B60R 13/07 296/208 |
| 2013/0231036 A1* | 9/2013 | Kim | B60H 1/00064 454/121 |
| 2014/0342650 A1* | 11/2014 | Nagaoka | B60H 1/00064 454/121 |
| 2015/0013372 A1* | 1/2015 | Harke | B60H 1/28 62/291 |

FOREIGN PATENT DOCUMENTS

| | | |
|---|---|---|
| DE | 10 2005 018 043 A1 | 11/2005 |
| EP | 1 314 589 A2 | 5/2003 |

\* cited by examiner

WATER CHAMBER FOR A MOTOR VEHICLE

CROSS REFERENCE TO RELATED APPLICATIONS

This application is a National Stage of International Application No. PCT/EP2013/058709, filed Apr. 26, 2013, claiming priority based on European Patent Application No. 12 166 145.8, filed Apr. 30, 2012, the contents of all of which are incorporated herein by reference in their entirety.

TECHNICAL FIELD

The present invention relates to a water box for a motor vehicle, a method for controlling the temperature of a water box and a motor vehicle having a water box. Water boxes are used in motor vehicles to separate water from air drawn in by an air conditioning unit.

PRIOR ART

To heat or cool the air in the passenger compartment, the normal practice in the case of motor vehicles is for fresh air to be drawn in from the outside and fed to the passenger compartment by means of an air conditioning unit. An air conditioning unit has at least one evaporator and/or a heater, by means of which the fresh air can be cooled or heated to a desired temperature. It can furthermore include an air delivery unit, such as, in particular, a fan, to draw in the air.

To enable fresh air that is as dry and free of droplets as possible to be made available to the air conditioning unit, a water box is generally provided in motor vehicles. The purpose of the water box is to separate water from the fresh air drawn in, thus ensuring that as few as possible water droplets enter the air conditioning unit. Particularly in the case of rain, water can be contained in the fresh air drawn in in the form of splash water or in the form of droplets. The provision of a water box is intended to prevent water droplets settling in the air filter of the air conditioning unit, which can result in unwanted mold formation.

A vehicle having an air conditioning unit and a water box of this kind is described in U.S. Pat. No. 5,518,449.

However, adjustment of the temperature, i.e. heating or cooling, of the air drawn in to a desired temperature in the air conditioning unit requires a significant quantity of energy. In the case of electric vehicles and hybrid vehicles, electric energy must be supplied from the battery or the accumulator for this purpose. This can significantly impair the overall energy balance of such motor vehicles.

In order to reduce the energy consumption of the air conditioning unit, there is a proposal in DE 199 32 691 to pre-cool the fresh air drawn in. This is achieved by humidifying the fresh air and exploiting the evaporation effect which occurs in the process. In this method, however, the moisture content of the air drawn in is necessarily increased.

In DE 196 13 684, it is proposed to collect the condensed water formed at the evaporator of the air conditioning unit in order to use it to cool a refrigerant circulating in the air conditioning unit and thereby to increase the efficiency of the air conditioning unit. Admittedly, this method reduces the energy required to cool the fresh air. However, the energy required to heat the fresh air drawn in, especially in winter, remains unaffected thereby.

SUMMARY OF THE INVENTION

It is therefore an object of the present invention to reduce the energy consumption in controlling the temperature of the passenger compartment of a motor vehicle.

The present invention thus presents a water box for a motor vehicle, having
- a wall, which delimits a first interior space;
- at least one air inlet opening, through which air, in particular fresh air, can flow into the first interior space;
- at least one air outlet opening, through which air can flow out of the first interior space; and
- at least one water outlet opening, which is suitable for removing water from the first interior space.

Here, the water box is designed as a heat exchanger, having a heat exchange element, which serves to transfer thermal energy from exhaust air into the first interior space. In addition, the water box has at least one structure, which serves to direct exhaust air to the heat exchange element in a controlled manner.

By virtue of the fact that the water box according to the invention is designed as a heat exchanger, the exhaust air, the temperature of which has already been adjusted, can be used to pre-adjust the temperature of the fresh air drawn in in the water box (i.e. to pre-cool or preheat it). In this way, it is possible to achieve an energy saving in the air conditioning unit. For this purpose, it is possible, in particular, to use exhaust air from the passenger compartment of the motor vehicle. As an alternative, however, it would also be conceivable to use exhaust air from the engine compartment, for example. As compared with a solution having a water box and a heat exchanger which is provided in the motor vehicle separately from the water box, designing the water box as a heat exchanger has the advantage that less installation space is taken up overall in the motor vehicle. Thus, in particular, the water box according to the invention also allows very compact joint accommodation of these two functional components in the motor vehicle, i.e. of a component for removing water from the fresh air, on the one hand, and of a component for transferring the thermal energy from the exhaust air to the fresh air, on the other hand.

Location and direction indications such as top, bottom, vertical, horizontal, upward, downward etc. in the following each refer to the water box, which is installed in a correct manner in a motor vehicle. The air inlet opening and advantageously also the air outlet opening are then usually arranged above the water outlet opening.

The air can thus flow through the water box via the air inlet opening, the first interior space and the air outlet opening and, in the process, deposit water, that is to say, in particular, splash water and water droplets.

The heat exchange element can be of any desired configuration as long as it fulfills the purpose of transferring thermal energy from exhaust air into the first interior space. However, at least a part of the wall which delimits the first interior space itself preferably forms the heat exchange element. Even more preferably, a large part of the wall which delimits the first interior space forms the heat exchange element. Most preferably, essentially the entire wall which delimits the first interior space forms the heat exchange element.

According to a development of the invention, the structure which is used to direct the exhaust air to the heat exchange element in a controlled manner, together with the heat exchange element, delimits a second interior space. There is then preferably at least one exhaust air inlet opening, through which exhaust air can flow into the second interior space, and at least one exhaust air outlet opening, through which exhaust air can flow out of the second interior space. As a particularly preferred option, the second interior space, with the exception of the exhaust air inlet openings and the exhaust air outlet openings, forms a closed space. It is advantageous if the exhaust air inlet openings and the exhaust air outlet openings are arranged in such a way that an exhaust air flow surrounding the first interior space over as large as possible an area arises in the second interior space. It is also possible, in particular, for there to be just a single exhaust air inlet opening and a single exhaust air outlet opening. As an alternative, however, it is also possible, for example, for the structure to be in the form of simple guide elements which direct the exhaust air flow in such a way that it is directed toward the heat exchange element in a controlled manner.

The wall which delimits the first interior space generally comprises an encircling side wall. The second interior space then preferably surrounds said side wall essentially completely. In this case, at least part of the second interior space preferably forms an annular space which extends around the first interior space.

The wall which delimits the first interior space furthermore usually comprises a bottom wall, within which the water outlet opening is arranged. It is advantageous if this bottom wall is in the form of a funnel, wherein the water outlet opening is arranged at the lowest point of said funnel. The second interior space then preferably largely covers said bottom wall at the bottom, in particular preferably even substantially completely.

The wall which delimits the first interior space furthermore usually comprises a top wall. The second interior space preferably largely covers said top wall at the top, in particular preferably even substantially completely.

It is advantageous if the second interior space extends over all the walls delimiting the first interior space.

The water outlet opening is generally delimited laterally by the inner surface of an encircling outlet pipe. In a preferred embodiment, said outlet pipe extends through the second interior space, in particular in the vertical direction.

In order to improve separation of water from the inflowing fresh air, the water box preferably has a baffle element, which projects into the first interior space and around which the inflowing air flows in a vertical and/or horizontal direction. In a development, said baffle element has a cavity, which is suitable for the passage of exhaust air. The baffle element then forms at least part of the heat exchange element.

The heat exchange element preferably has heat exchange structures for enlarging the surface area of the heat exchange element. The heat exchange structures can be ribs, grooves, fins or projections, for example. In particular, the heat exchange structures can be arranged on the side of the heat exchange element facing the first interior space. However, they can also be arranged on the side of the heat exchange element around which the exhaust air flows, i.e. if there is a second interior space, on the side facing the second interior space. As a particularly preferred option, however, the heat exchange structures are configured in such a way that the heat exchange element has one or more walls of undulating design which are bent or curved alternately inward and outward, thus enlarging the corresponding surface area on both the inside and the outside.

In a development, the water box has at least one conduit for directing at least some of the water flowing out of the water outlet opening toward the heat exchange element. It is advantageous if this conduit is even used to direct all the water flowing out of the water outlet opening toward the heat exchange element. By virtue of the evaporation effect, this can bring about additional cooling of the heat exchange element and thus of the fresh air flowing into the water box. It is advantageous here if the outflowing water is directed toward the heat exchange element in such a way that it is first mixed with exhaust air and is then directed together with the latter toward the heat exchange element.

The heat exchange element preferably has a wall thickness of less than 1 mm, in particular less than 0.5 mm. It is thereby possible to achieve good thermal conductivity of the heat exchange element, irrespective of the material used. As an alternative or in addition, the heat exchange element can also be produced from a material with good thermal conductivity, especially metal for example. However, it can also be produced from a plastic, especially polypropylene for example. If the heat exchange element is produced from polypropylene (PP), it preferably contains 20% of talc.

Also disclosed is a method for controlling the temperature of the water box of a motor vehicle, which has at least the following steps:

provision of an air conditioning unit having an air delivery unit and of a water box designed as a heat exchanger, having an air inlet opening and a heat exchange element in a motor vehicle;

induction of fresh air by means of the air delivery unit through the air inlet opening and the water box to the air conditioning unit, and passing said air from the air conditioning unit into a passenger compartment of the motor vehicle.

The method furthermore has the step of directing exhaust air, which may derive from the passenger compartment or the engine compartment, toward the heat exchange element in a controlled manner in order thereby to control the temperature of the fresh air flowing through the water box.

Also disclosed is a motor vehicle, in particular a passenger vehicle, i.e. a motor car, having a passenger compartment;

an air conditioning unit having an air delivery unit, e.g. a fan; and a water box, which is designed as a heat exchanger and has a heat exchange element and an air inlet opening, at which fresh air can be drawn in by means of the air delivery unit, such that said air passes through the water box to the air conditioning unit and, from the latter, into the passenger compartment, wherein furthermore at least one structure is provided, which serves to direct exhaust air to the heat exchange element of the water box in a controlled manner. In particular, this can be exhaust air from the passenger compartment but, as an alternative, can also be exhaust air from the engine compartment.

In order to direct the exhaust air toward the water box, there can be an air delivery unit provided especially for this purpose, especially a fan for example, in the motor vehicle.

The motor vehicle preferably has at least one conduit for directing at least a part of the water, which arises in the air conditioning unit in the form of condensed water for example, toward the heat exchange element. It is advantageous if this conduit is even used to direct all the water arising in the air conditioning unit toward the heat exchange element. By virtue of the evaporation effect, this can bring about additional cooling of the heat exchange element and thus of the fresh air flowing into the water box. It is advantageous here if the water is directed toward the heat exchange element in such a way that it is first mixed with exhaust air and is then directed together with the latter toward the heat exchange element.

BRIEF DESCRIPTION OF THE DRAWINGS

Preferred embodiments of the invention are described below with reference to the drawings, which are used merely for explanation and should not be taken to be restrictive. In particular, the size ratios illustrated in the drawings may also be embodied differently in a specific embodiment. In the drawings.

DESCRIPTION OF PREFERRED EMBODIMENTS

Figure 1:
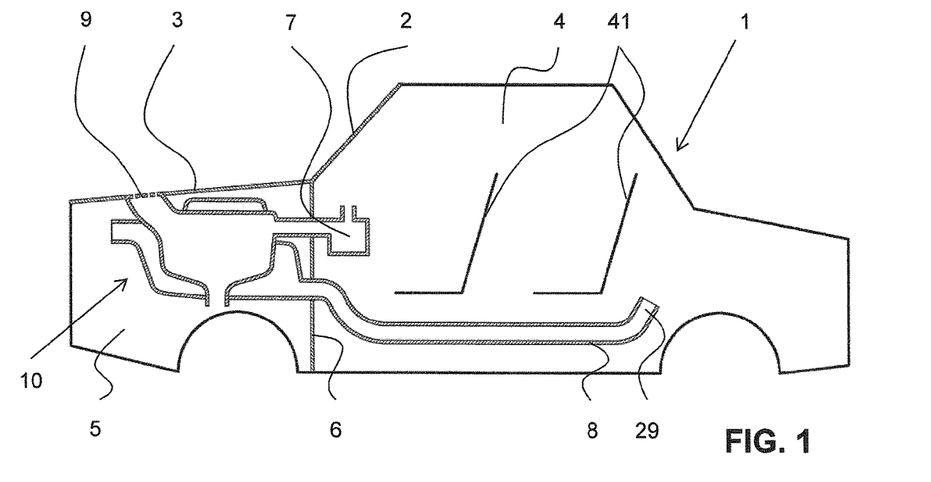
FIG. 1 shows a central section through a motor vehicle having an air conditioning unit and a water box in accordance with a first embodiment according to the invention.

FIG. 1 illustrates schematically a motor vehicle 1, in which a water box 10 in accordance with a first embodiment according to the invention is provided. The water box 10 is accommodated in the engine compartment 5 of the motor vehicle 1 and has an air inlet opening 9, which opens to the outside in the region of an engine hood 3. Fresh air can be drawn through the air inlet opening 9 and through the interior of the water box 10 by an air conditioning unit 7, and this air is passed from the air conditioning unit 7 into the passenger compartment 4. In comparison with the water box 10, the air conditioning unit 7 is arranged on the opposite side of a bulkhead 6, which separates the engine compartment 5 from the passenger compartment 4. Normally, the air conditioning unit 7 is arranged in the dashboard or in a frontal area in the passenger compartment 4 of the motor vehicle 1. The air inlet opening 9 could also be arranged at any other position in the motor vehicle 1, in particular in the transitional area between the windshield 2 and the engine hood 3.

The air contained in the passenger compartment 4 is directed to the water box 10 via an intake conduit 8 in order to pre-adjust the temperature of the fresh air flowing in through the water box 10. The intake conduit 8 can be a separate element in relation to the water box 10 and can be connected to the water box by means of a screwed joint, for example. The intake conduit 8 has an exhaust air inlet opening 29, which is preferably arranged in a rear area of the motor vehicle 1, in particular in an area behind the passenger seat arranged furthest toward the rear in the motor vehicle 1. Such an arrangement of the exhaust air inlet opening 29 of the intake conduit 8 allows optimum air circulation in the passenger compartment 4.

In general, a single air delivery unit arranged in the air conditioning unit 7 brings about all the air circulation, starting from induction of the fresh air through the air inlet opening 9 to the expulsion of the exhaust air through the exhaust air outlet opening 30 of the water box 10. In particular, this air delivery unit can be a fan 18 (see FIG. 2). However, it is also possible to provide additional air delivery units within the intake conduit 8 or in the region of the water box 10, at any desired position in the passenger compartment 4 or in the engine compartment 5, in order to draw in the exhaust air from the passenger compartment 4. It is advantageous if these air delivery units are then controlled in accordance with the operating state of the air conditioning unit 7.

Figure 2:
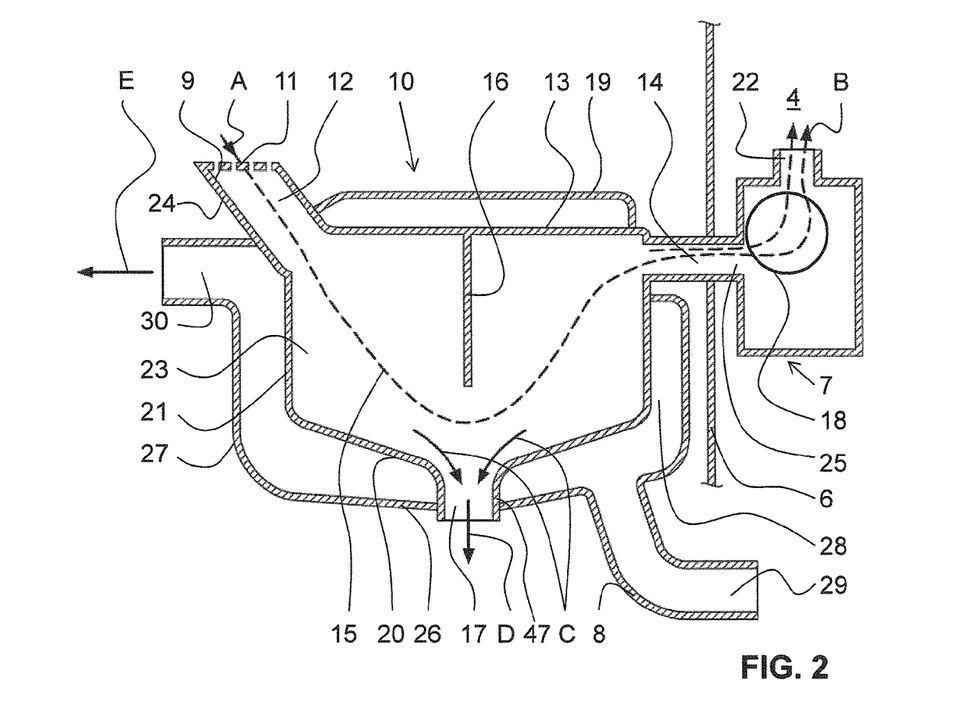
FIG. 2 shows a central section through the water box and through the air conditioning unit of the motor vehicle shown in FIG. 1.

The water box 10 shown in FIG. 1 is illustrated in detail in FIG. 2. The water box 10 forms a hollow body with an encircling inner side wall 21, which extends upwards from an inner bottom wall 20. Together with an inner top wall 13, the inner side wall 21 and the inner bottom wall 20 delimit a first interior space 23. The inner side wall 21 is of substantially hollow-cylindrical configuration, and it can widen slightly in an upward direction. The inner bottom wall 20 is of funnel shaped design and widens from the bottom up. At its lowermost point, the inner bottom wall 20 has a centrally arranged water outlet opening 17, which is delimited laterally by the encircling inner surface of an outlet pipe 47, which extends downward from the inner bottom wall 20.

In the transition zone between the inner top wall 13 and the inner side wall 21, a feed conduit 24 is provided, which forms an inlet duct 12. This inlet duct connects the air inlet opening 9 to the first interior space 23 of the water box 10. A discharge conduit, which forms an air duct 14, is provided diametrically opposite the feed conduit 24 in the upper region of the inner side wall 21. The air duct 14 passes through the bulkhead 6 and opens into an air outlet opening 25.

Mounted opposite the water outlet opening 17, on the inner top wall 13, is a baffle element 16, which extends in a vertical direction into the first interior space 23 from the inner top wall 13. Here, the baffle element 16 extends slightly less in the vertical direction than the inner side wall 21. In the horizontal direction, the baffle element 16 extends in a diametral direction across the inner top wall 13, perpendicular to an imaginary line connecting the openings of the inlet duct 12 and of the air duct 14 into the first interior space 23.

A grille 11 can be provided in the region of the air inlet opening 9 to prevent unwanted constituents of the splash water from penetrating into the feed conduit 24 and thus into the first interior space 23. This is intended particularly to prevent entry of snow and foliage.

The air outlet opening 25 opens into the air conditioning unit 7, which has an air delivery unit in the form of a fan 18. The air conditioning unit 7 furthermore comprises an evaporator and/or a heating element, although neither of these is illustrated in the figures. The air conditioning unit 7 furthermore has an air outlet 22, which opens into the passenger compartment 4 of the motor vehicle 1.

As indicated by dashed lines in FIG. 2, the fresh air is drawn through the air inlet opening 9 in the direction of arrow A by means of the fan 18 and passes through the inlet duct 12 into the first interior space 23 of the water box 10. In the first interior space 23, the droplet-containing fresh air flows around the baffle element 16, which could in principle also be designed in such a way that the air flow 15 flows around it horizontally. Water droplets contained in the fresh air drawn in are separated out at the baffle element 16, are collected by the inner bottom wall 20 and then flow downward into the water outlet opening 17 in accordance with the arrows C. The water separated out leaves the water box 10 in a downward direction through the water outlet opening 17 (arrow D). The air flow 15, which is largely free of water droplets, then passes via the air duct 14 into the air conditioning unit 7, where the air can be heated or cooled. From within the air conditioning unit 7, the air flow 15 then passes through the air outlet 22 into the passenger compartment 4 (see arrow B).

In order now to pre-adjust the temperature of the fresh air drawn in by the air conditioning unit 7 and thereby reduce the energy requirement of the air conditioning unit 7, the water box 10 is designed as a heat exchanger, wherein the inner walls 13, 20 and 21 jointly form a heat exchange element. Moreover, the water box 10 has structures which are used to direct exhaust air from the passenger compartment 4 to said heat exchange element in a controlled manner. For this purpose, the water box 10 has an outer side wall 27, which is of essentially hollow-cylindrical configuration and is arranged so as to encircle the inner side wall 21. At its lower end, the outer side wall 27 merges into an outer bottom wall 26, which covers the inner bottom wall 20 substantially completely at the bottom. The outer bottom wall 26 has a central opening, through which the outlet pipe 47 extends. At its upper end, the outer side wall 27 merges into an outer top wall 19, which covers the inner top wall 13 substantially completely at the top.

Together with the inner side wall 21, the inner bottom wall 20 and the inner top wall 13, the outer side wall 27, the outer bottom wall 26 and the outer top wall 19 delimit a second interior space 28, which surrounds the inner side wall 21 and covers the inner bottom wall 20 and the inner top wall 13. In the region of the inner side wall 21, part of the second interior space 28 thus forms an encircling annular space.

Provided in a region facing the bulkhead 6, in the region of the outer bottom wall 26, is an intake conduit 8, which opens from below into the second interior space 28. The intake conduit 8 has an exhaust air inlet opening 29, which can be arranged in the passenger compartment 4 or in the engine compartment 5. In the case where the exhaust air inlet opening 29 is arranged in the engine compartment 5, the intake conduit 8 can be connected to another conduit, which extends through the bulkhead 6 into the passenger compartment 4. An exhaust air outlet opening 30 is provided in an upper region of the outer side wall 27, on the side of the water box 10 facing away from the bulkhead 6. Relative to the second interior space 28, this exhaust air outlet opening 30 is arranged so as to be diagonally opposite in space to the intake conduit 8, allowing an air flow in the second interior space 28 from the intake conduit 8 to the exhaust air outlet opening 30, which surrounds the first interior space 23 over a maximum area.

During the operation of the air conditioning unit 7, exhaust air is thus directed out of the passenger compartment 4 through the intake conduit 8 into the second interior space 28 of the water box 10. In the second interior space 28, the already tempered exhaust air flows around the inner bottom wall 20, the inner top wall 13 and the inner side wall 21, as a result of which the temperature of the exhaust air is transferred to the fresh air flowing through the first interior space 23. The temperature of the fresh air present in the first interior space 23 is thereby pre-adjusted. The exhaust air directed through the intake conduit 8 thus flows around substantially all the walls delimiting the first interior space 23. The exhaust air then leaves the water box 10 via the exhaust air outlet opening 30 in the direction of arrow E.

In order to permit more efficient transfer of the thermal energy, there can be heat exchange structures on the inner side of the inner side wall 21 and/or of the inner top wall 13 and/or of the inner bottom wall 20 in the first interior space 23 and/or on the outside thereof in the second interior space 28 in order to enlarge the respective surface areas. These can be, for example, ribs, grooves, projections or other structures sufficiently well known to a person skilled in the art and appropriately suitable for this purpose. As a particularly preferred option, the inner side wall 21 and/or the inner top wall 13 and/or the inner bottom wall 20 are of at least partially corrugated design. Alternative embodiments of the invention are shown in FIGS. 3 to 6, in which identical or similar features are each denoted by the same reference signs.

Figure 3:
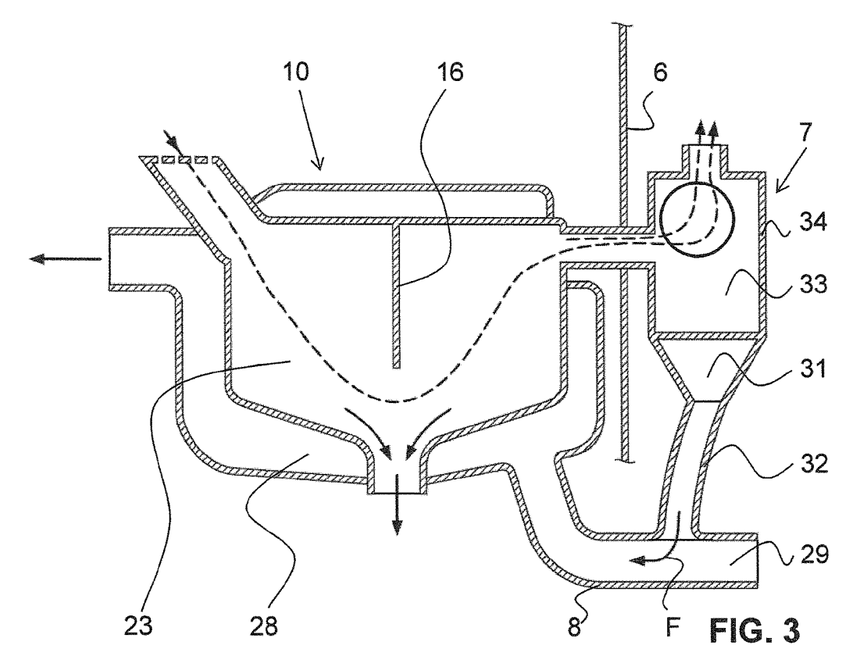
FIG. 3 shows a central section through an air conditioning unit and through the water box shown in FIG. 2, wherein the water arising in the air conditioning unit is used here additionally for cooling purposes.

In comparison with the embodiment in FIG. 2, the housing 34 of the air conditioning unit 7 of the embodiment in FIG. 3 additionally has a water outlet opening 31 arranged in the bottom area. The water outlet opening 31, which is of funnel-shaped configuration, collects the water arising in the interior space 33 of the air conditioning unit 7, which is, in particular, condensed water, and carries it to a connecting conduit 32. In accordance with arrow F, the water passes via the connecting conduit 32 into the intake conduit 8, in which it humidifies the exhaust air and cools down owing to the evaporation effect. In this way, the exhaust air drawn in from the passenger compartment 4 can be precooled, thereby making it possible to achieve a greater cooling action in relation to the fresh air contained in the first interior space 23 of the water box 10. In an alternative embodiment, the connecting conduit 32 could also open directly into the second interior space 28 of the water box 10, instead of into the intake conduit 8.

Figure 4:
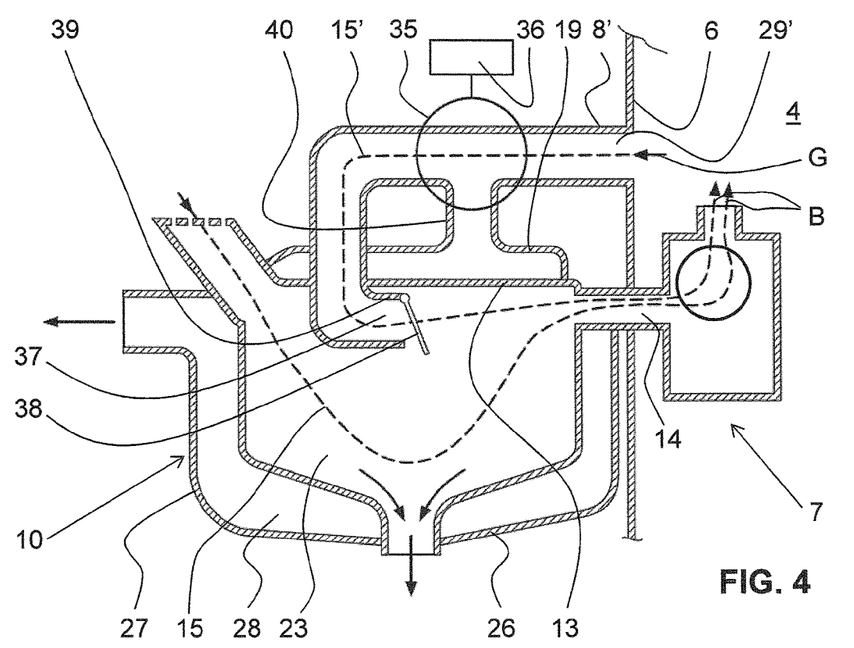
FIG. 4 shows a central section through an air conditioning unit and through a water box in accordance with a second embodiment according to the invention.

In the embodiment shown in FIG. 4, exhaust air from the passenger compartment 4 is passed directly into the first interior space 23 of the water box 10 through an exhaust air inlet opening 29' via an intake conduit 8' (see the air flow 15' indicated by a dashed line). In the first interior space 23, the exhaust air is mixed with the fresh air drawn in, thereby pre-adjusting the temperature of the fresh air. In addition, the moisture content of the air fed to the passenger compartment 4 is thereby reduced. It is advantageous if a bend 39, which guides the air flow 15' into the first interior space 23 in a direction which is as far as possible parallel to the air flow 15 and, in particular, is oriented toward the air duct 14, is provided. The bend 39 thus has an outlet opening 37 arranged in the first interior space 23. This can be closable by means of a flap 38. Here, closure can be accomplished in a purely passive way or, alternatively, the flap 38 can be actively controllable. In all the embodiments but especially in that shown in FIG. 4, it is perfectly possible for the provision of a baffle element 16 to be omitted.

In order to pre-adjust the temperature of the fresh air flowing through the first interior space 23 in the embodiment shown in FIG. 4, a connecting conduit 40 is provided, said connecting conduit connecting the intake conduit 8' and the outer top wall 19 to one another. Some of the exhaust air drawn in through the exhaust air inlet opening 29' in accordance with arrow G thus passes via the connecting conduit 40 into the second interior space 28. Here, a valve 35 determines the quantity of exhaust air which passes through the connecting conduit 40 into the second interior space 28 and the quantity which passes through the bend 39 into the first interior space 23. The valve 35 is connected to a control device 36 and can be controlled by the latter.

Figure 5:
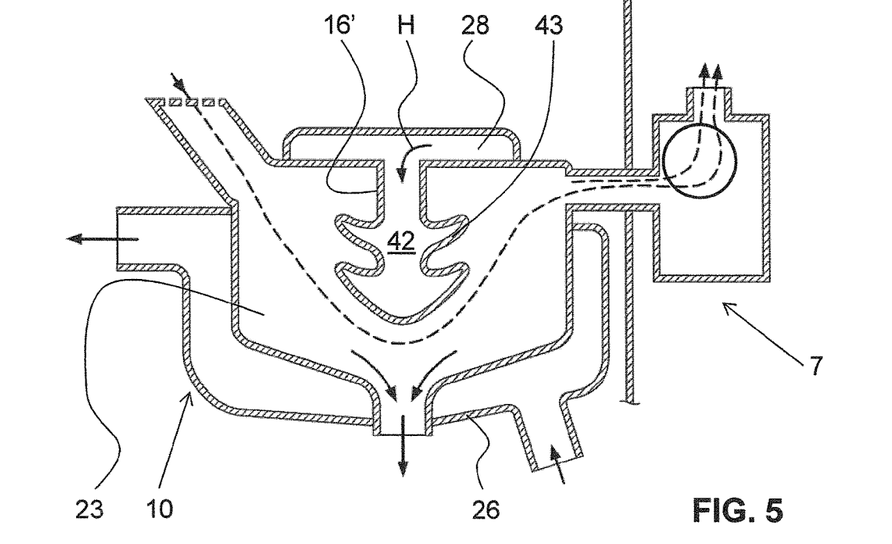
FIG. 5 shows a central section through an air conditioning unit and through a water box in accordance with a third embodiment according to the invention.

In the embodiment shown in FIG. 5, a baffle element 16 is provided, which, in contrast to the embodiment shown in FIG. 2, has a cavity 42 through which the exhaust air can flow in from the second interior space 28 (see arrow H). The cavity 42 thus forms an extension of the second interior space 28. In order to enlarge the surface area of the baffle element 16' which is effective for heat exchange, there is a corrugated region 43, which is formed by the encircling grooves. In the region of this corrugated region 43, which forms a heat exchange structure, the side walls of the baffle element 16' which delimit the cavity 42 are each bent or curved outward into the first interior space 23. The outward-facing raised portions of the corrugated region 43 are each bent upward slightly. The presence of such a corrugated region 43 on the baffle element 16' improves not only the transmission of thermal energy from the exhaust air to the fresh air contained in the first interior space 23 but also brings about better droplet separation, since the baffle element 16' acts as a droplet collector. In order to improve the drainage of the separated droplets from the baffle element 16', it would also alternatively be possible, instead of a plurality of grooves, for there to be a single groove running around the baffle element 16' in a spiral. In an alternative embodiment, a duct of any desired design could furthermore be provided in the cavity 42 to guide the exhaust air initially downward and then back up again along the surface of the baffle element 16'.

Figure 6:
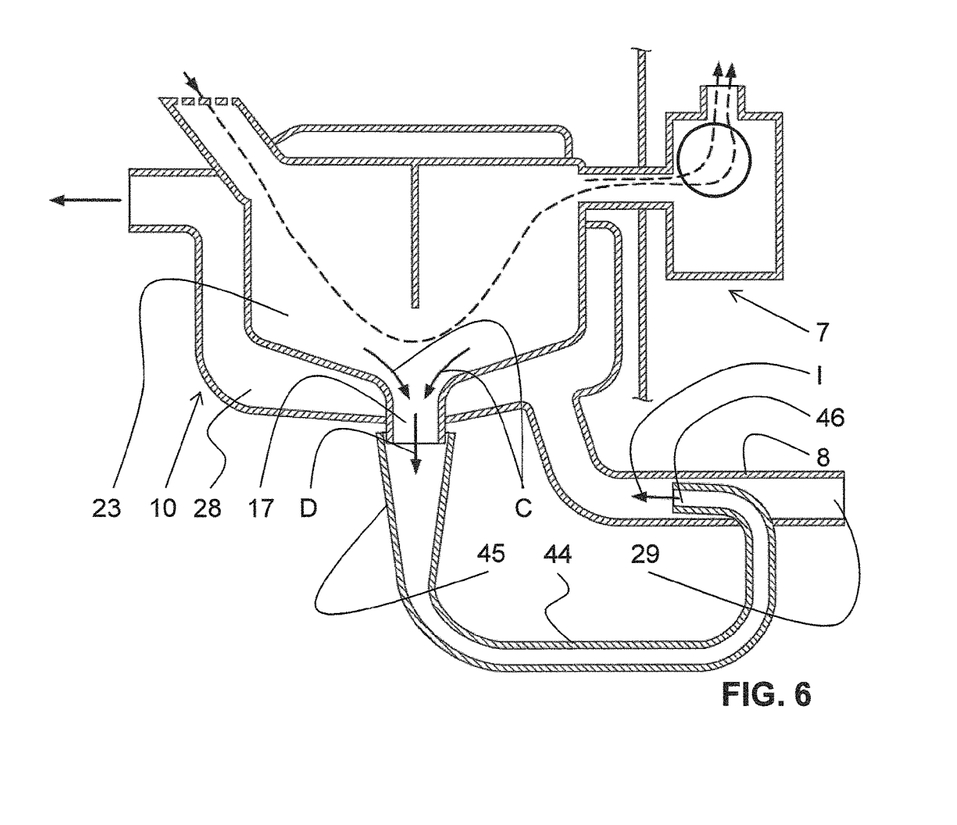
FIG. 6 shows a central section through an air conditioning unit and through the water box shown in FIG. 2, wherein the water arising in the water box is used here additionally for cooling purposes.

In the embodiment shown in FIG. 6, in contrast to the embodiment in FIG. 2, a connecting conduit 44 is provided in addition, which directs precipitated water emerging in the direction of arrow D through the water outlet opening 17 from the first interior space 23 into the intake conduit 8 in the direction of arrow I. For this purpose, the connecting conduit 44 is connected to a collecting funnel 45, which is connected to the water outlet opening 17. At the opposite end from the collecting funnel 45, the connecting conduit 44 has an outlet opening 46, which is arranged within the intake conduit 8. In the intake conduit 8, the collected water mixes with the exhaust air and humidifies the latter. By virtue of the evaporation effect, this cools the exhaust air. In this way, it is possible to achieve an improved cooling effect of the fresh air flowing through the first interior space 23 of the water box 10.

The inner bottom wall 20, the inner side wall 21, the inner top wall 13 and the wall of the baffle element 16' preferably each have a wall thickness of less than 1 mm, in particular less than 0.5 mm. Good thermal conductivity is thereby achieved. However, the wall thickness of the outer walls, i.e. of the outer side wall 27, the outer bottom wall 26 and the outer top wall 19, is preferably greater than 2 mm in order to achieve good mechanical stability and better insulation of the water box 10 from the outside.

In the embodiments considered, the walls of the water box 10 are each produced from polypropylene containing 20% of talc. As an alternative, however, it would, of course, also be possible for these walls to be produced from some other material. Particularly in the case of the inner walls, a material with good thermal conductivity, e.g. metal, could be used, for example.

Of course, the invention described here is not restricted to the embodiments mentioned, and a large number of modifications is possible. Thus, the first interior space 23 of the water box 10 could be of any other geometrical configuration, for example. Moreover, the water box 10 does not necessarily have to have a second interior space 28, for example. It would also be possible, for example, to provide a meandering conduit for the through flow of exhaust air in the first interior space 23. This meandering conduit would then form the heat exchange element instead of or in addition to the inner walls 13, 20 and 21. Moreover, the air conditioning unit 7 could also be arranged completely in the engine compartment 5. It would also be possible for additional elements, e.g. an emergency outlet opening for the precipitated water, to be provided in the water box 10. Of course, the various elements of the embodiments shown in FIGS. 1 to 6 can furthermore be combined in any desired manner. A large number of further modifications is conceivable.

LIST OF REFERENCE SIGNS

1 motor vehicle
2 windshield
3 engine hood
4 passenger compartment
5 engine compartment
6 bulkhead
7 air conditioning unit
8, 8' intake conduit
9 air inlet opening
10 water box
11 grille
12 inlet duct
13 inner top wall
14 air duct
15, 15' air flow
16, 16' baffle element
17 water outlet opening
18 fan
19 outer top wall
20 inner bottom wall
21 inner side wall
22 air outlet
23 first interior space
24 feed conduit
25 air outlet opening
26 outer bottom wall
27 outer side wall
28 second interior space
29, 29' exhaust air inlet opening
30 exhaust air outlet opening
31 water outlet opening
32 connecting conduit
33 interior space
34 housing
35 valve
36 control device
37 outlet opening
38 flap
39 bend
40 connecting conduit
41 passenger seat
42 cavity
43 corrugated region
44 connecting conduit
45 collecting funnel
46 outlet opening
47 outlet pipe
A-I arrows

The invention claimed is:

1. A water box for a motor vehicle, having
a wall, which delimits a first interior space,
at least one air inlet opening, through which air can flow into the first interior space,
at least one air outlet opening, through which air can flow out of the first interior space and
at least one water outlet opening, which is suitable for removing water from the first interior space,
wherein the water box is designed as a heat exchanger, having a heat exchange element, which serves to transfer thermal energy from exhaust air into the first interior space, wherein at least a part of the wall which delimits the first interior space forms the heat exchange element, and wherein the water box has at least one structure, which directs exhaust air to the heat exchange element.

2. The water box as claimed in claim 1, wherein essentially the entire wall which delimits the first interior space forms the heat exchange element.

3. The water box as claimed in claim 1, wherein the structure together with the heat exchange element delimits a second interior space, and wherein an exhaust air inlet opening is provided, through which exhaust air can flow into the second interior space, and an exhaust air outlet opening is provided, through which exhaust air can flow out of the second interior space.

4. The water box as claimed in claim 3, wherein the wall which delimits the first interior space comprises an encircling side wall, and wherein the second interior space surrounds said side wall essentially completely.

5. The water box as claimed in claim 3, wherein the wall which delimits the first interior space comprises a bottom wall, within which the water outlet opening is arranged, and wherein the second interior space largely covers said bottom wall.

6. The water box as claimed in claim 3, wherein the wall which delimits the first interior space comprises a top, and wherein the second interior space largely covers said top wall.

7. The water box as claimed in claim 3, wherein the water outlet opening is delimited laterally by the encircling inner surface of an outlet pipe which extends through the second interior space.

8. The water box as claimed in claim 1, furthermore having a baffle element, which is arranged in the first interior space and serves to separate water from the air flowing through the first interior space, wherein the baffle element has a cavity, which is suitable for the passage of exhaust air.

9. The water box as claimed in claim 1, wherein the heat exchange element has heat exchange structures for enlarging the surface area of the heat exchange element.

10. The water box as claimed in claim 1, wherein the water box has at least one conduit for directing at least some of the water flowing out of the water outlet opening toward the heat exchange element.

11. The water box as claimed in claim 1, wherein the heat exchange element has a wall thickness of less than 1 mm, in particular less than 0.5 mm.

12. A method for controlling the temperature of the water box of a motor vehicle, having the following steps:
provision of an air conditioning unit having an air delivery unit and of a water box designed as a heat exchanger, having an air inlet opening and a heat exchange element in a motor vehicle, wherein the water box has a wall which delimits a first interior space, and wherein at least part of the wall which delimits the first interior space forms the heat exchange element;
induction of fresh air by means of the air delivery unit through the air inlet opening and the water box to the air conditioning unit, and passing said air from the air conditioning unit into a passenger compartment of the motor vehicle;
wherein the method furthermore has the step of directing exhaust air toward the heat exchange element in order thereby to control the temperature of the fresh air flowing through the water box.

13. A motor vehicle having
a passenger compartment,
an air conditioning unit having an air delivery unit, and
a water box, which is designed as a heat exchanger and has a heat exchange element and an air inlet opening, at which fresh air can be drawn in by means of the air delivery unit, such that said air passes through the water box to the air conditioning unit and, from the air conditioning unit, into the passenger compartment,
wherein the water box has a wall which delimits a first interior space, wherein at least part of said wall which delimits the first interior space forms the heat exchange element, and
wherein furthermore at least one structure is provided, which directs exhaust air to the heat exchange element of the water box.

14. The motor vehicle as claimed in claim 13, wherein the motor vehicle has at least one conduit for directing at least a part of the water arising in the air conditioning unit toward the heat exchange element.

* * * * *